US010373532B2

(12) United States Patent
Hetrick et al.

(10) Patent No.: US 10,373,532 B2
(45) Date of Patent: Aug. 6, 2019

(54) SURFACE MOUNTED LIGHT FIXTURES WITH HANGING FEATURES FOR INSTALLATION

(71) Applicant: Cooper Technologies Company, Houston, TX (US)

(72) Inventors: Westly Davis Hetrick, Atlanta, GA (US); Grzegorz Wronski, Peachtree City, GA (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 15/816,761

(22) Filed: Nov. 17, 2017

(65) Prior Publication Data

US 2018/0144669 A1 May 24, 2018

Related U.S. Application Data

(60) Provisional application No. 62/423,931, filed on Nov. 18, 2016.

(51) Int. Cl.

| | |
|---|---|
| ***G09F 13/04*** | (2006.01) |
| ***F21V 8/00*** | (2006.01) |
| ***F21S 8/00*** | (2006.01) |
| ***F21V 21/02*** | (2006.01) |
| ***G08B 7/06*** | (2006.01) |
| *F21Y 115/10* | (2016.01) |

(52) U.S. Cl.
CPC ................ *G09F 13/04* (2013.01); *F21S 8/03* (2013.01); *F21V 21/02* (2013.01); *G02B 6/0023* (2013.01); *G02B 6/0083* (2013.01); *G08B 7/062* (2013.01); *F21Y 2115/10* (2016.08); *G09F 2013/0459* (2013.01)

(58) Field of Classification Search
CPC ............................................... G09F 2013/0459
USPC ...................... 40/570, 564, 574, 716, 611.03
See application file for complete search history.

(56) References Cited

U.S. PATENT DOCUMENTS 3,780,284 A * 12/1973 Dewhirst ................ F21V 17/00 362/260
5,768,814 A * 6/1998 Kozek ..................... G09F 13/04 362/183
5,887,968 A * 3/1999 Logan ..................... G09F 13/14 362/240
6,050,013 A * 4/2000 Heaton ................... G09F 13/04 40/570
2006/0185204 A1* 8/2006 Holt ........................ G09F 13/04 40/564

(Continued)

*Primary Examiner* — Joanne Silbermann
(74) *Attorney, Agent, or Firm* — King & Spalding LLP

(57) ABSTRACT

A light fixture includes a back plate that has a first securing element that is formed in at least one corner of a sidewall of the back plate. Further, the light fixture includes a cover that is configured to be coupled to the back plate. The cover includes a second securing element that is formed in at least one corner of the cover that is cut out such that at least a portion of the cover fits within a cavity formed by the sidewall of the back plate when the cover is coupled to the back plate in an electrical connection phase. In the electrical connection phase, the cover is coupled to the back plate by engaging the second securing element with the first securing element such that the cover hangs from the back plate and is substantially perpendicular to the back plate, and the cavity is exposed.

20 Claims, 5 Drawing Sheets

(56) References Cited

U.S. PATENT DOCUMENTS

2011/0138665 A1 * 6/2011 Liu .......................... F21S 9/022
40/570

* cited by examiner 400
410
410
410
402
405
405
490
414
412
406
205
410
430a
416
408
420
418
408
432
430a
210
408
430b
404

SURFACE MOUNTED LIGHT FIXTURES WITH HANGING FEATURES FOR INSTALLATION

CROSS-REFERENCE TO RELATED APPLICATIONS

The present application claims priority under 35 U.S.C. § 119(e) to U.S. Provisional Patent Application No. 62/423,931, titled "Surface Mounted Light Fixtures With Hanging Features For Installation," and filed on Nov. 18, 2016. The entire contents of the foregoing application are hereby incorporated herein by reference.

TECHNICAL FIELD

Embodiments relate generally to lighting solutions, and more particularly to systems, methods, and devices for facilitating the installation of a light fixture.

BACKGROUND

Surface mounted light fixtures typically come in two parts—a back plate that is coupled to a wall or a ceiling, and a cover that is coupled onto the back plate. During installation, it is convenient to have the two parts near each other to accomplish the electrical connections. Often, while the installer makes the electrical connections, the installer has to hold the cover in one hand which in turn leaves the installer with only one free hand to make electrical connections. Since the installer cannot use both his/her hands to make the electrical connection, the installer may find this approach very inconvenient and inefficient.

Mechanisms for placing the cover in proximity to the back plate during installation do exist. For example, a hinge may be provided between the two parts. However, adding hinges to the cover and back plate may be cost prohibitive. Another example includes providing a tether between the two parts. However, adding tethers to the cover and the back plate may also be cost prohibitive. Furthermore, tethers may not rigidly hold the cover in proximity to the back plate and the installer still may be required to support the cover with one hand. Yet another example includes providing snaps that hold the cover and back plate together during installation. However, the installation of snaps are limited to plastic parts that can utilize the snaps. Accordingly, snaps are not a feasible option for light fixtures made using other types of materials.

In view of the foregoing shortcomings, there is a need for technology that holds the two parts of the surface mounted light fixtures rigidly and in close proximity to each other during the installation of a surface mounted light fixture. This background information is provided to reveal information believed by the applicant to be of possible relevance to the present disclosure. No admission is necessarily intended, nor should be construed, that any of the preceding information constitutes prior art against the present disclosure.

SUMMARY

In one aspect, the present disclosure is related to a light fixture that includes a back plate that is configured to be mounted to a mounting surface. The back plate includes a base; a sidewall disposed adjacent to and extending along a perimeter of the base, and a rib formed in at least one corner of the sidewall. The sidewall is substantially perpendicular to the base and defines a cavity in concert with the base. The light fixture further includes a cover that is configured to be coupled to the back plate. The cover includes a front panel having one or more corners that are cut out such that at least a portion of the front panel fits within the cavity formed by the sidewall of the back plate when coupled to the back plate in an electrical connection phase. At least one corner of the cover includes a notch formed therein. In the electrical connection phase, the cover is coupled to the back plate by engaging the notch formed in the at least one corner of the cover with the rib formed in the at least one corner of the sidewall of the back plate.

In another aspect, the present disclosure is related to a light fixture that includes a light fixture that has a back plate that is configured to be mounted to a mounting surface. The back plate includes a base, a sidewall disposed adjacent to a perimeter of the base, and a first securing element formed in the sidewall. The sidewall defines a cavity in concert with the base. Further, the light fixture includes a cover that is configured to be coupled to the back plate. The cover includes a front panel that is defined such that at least a portion of the front panel fits within the cavity formed by the sidewall of the back plate when coupled to the back plate in an electrical connection phase. The cover further includes a second securing element formed in the front panel. In the electrical connection phase, the cover is coupled to the back plate by engaging the second securing element formed in the cover with the first securing element formed in the sidewall of the back plate such that the cover is substantially perpendicular to the back plate and the cavity is exposed.

These and other aspects, objects, features, and embodiments, will be apparent from the following description and the appended claims.

BRIEF DESCRIPTION OF THE FIGURES

The foregoing and other features and aspects of the present disclosure are best understood with reference to the following description of certain example embodiments, when read in conjunction with the accompanying drawings, wherein.

Figure 1:
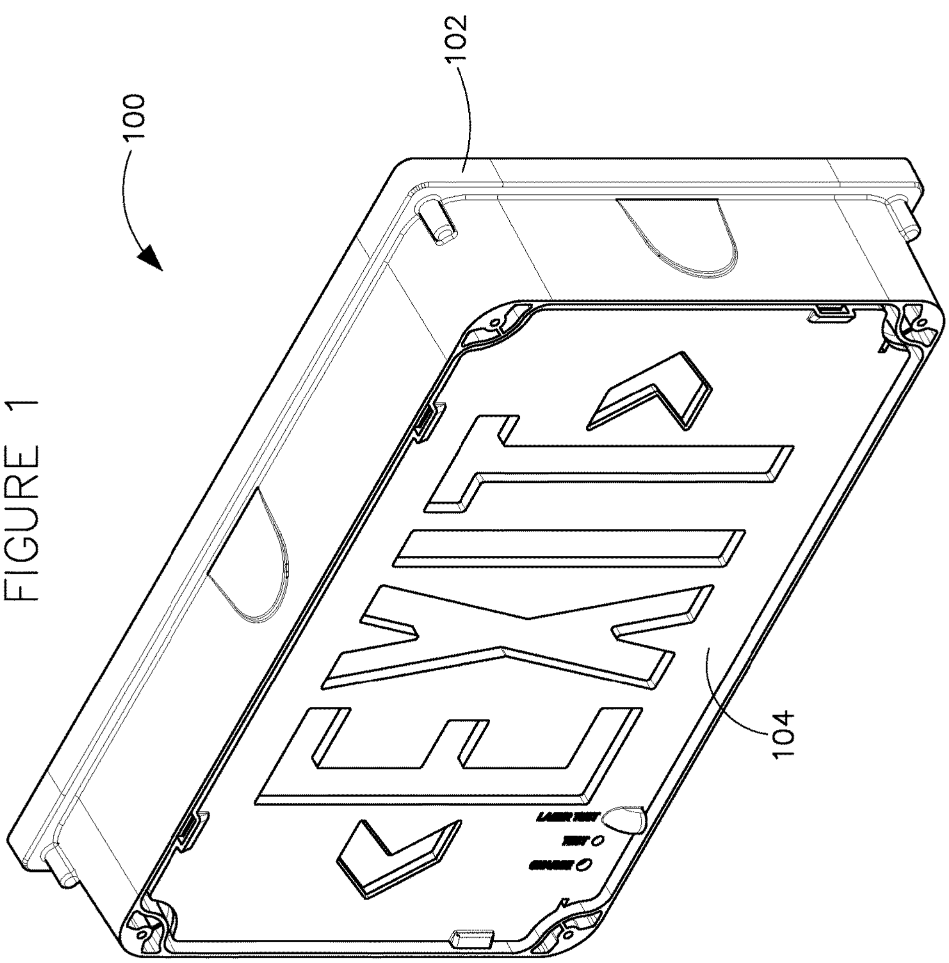
FIG. 1 illustrates a front perspective view of an example surface mounted light fixture, in accordance with example embodiments of the present disclosure.

The drawings illustrate only example embodiments of the present disclosure and are therefore not to be considered limiting of its scope, as the present disclosure may admit to other equally effective embodiments. The elements and features shown in the drawings are not necessarily to scale, emphasis instead being placed upon clearly illustrating the principles of the example embodiments. Additionally, certain dimensions or positioning may be exaggerated to help visually convey such principles.

DETAILED DESCRIPTION OF EXAMPLE EMBODIMENTS

The present disclosure describes an example surface mounted light fixture having one or more hanging features that are cast into each of the cover and back plate of the surface mounted light fixture. The hanging features allow the cover of the surface mounted light fixture to be inserted into the back plate and be held rigidly while making electrical connections during installation. For example, the back plate includes one or more ribs formed in one or more corners of the back plate. Further, the cover includes cut out corners that permit the cover to fit within the back plate. One or more notches are formed into one or more corners of the cover. In an electrical connection phase, the cover maybe inserted into the back plate such that the notch of the cover is aligned and disposed above the rib of the back plate. Then, to rigidly hold the cover and the back plate in close proximity to each other, the cover is moved down such that the notch in the corner of the cover may engage the rib in the corner of the back plate. In another example, the rib in the back plate may have an aperture and the notch in the corner of the cover may be further defined to form a finger/post that is configured to engage with the aperture on the rib to securely lock the cover to the back plate.

Figure 2:
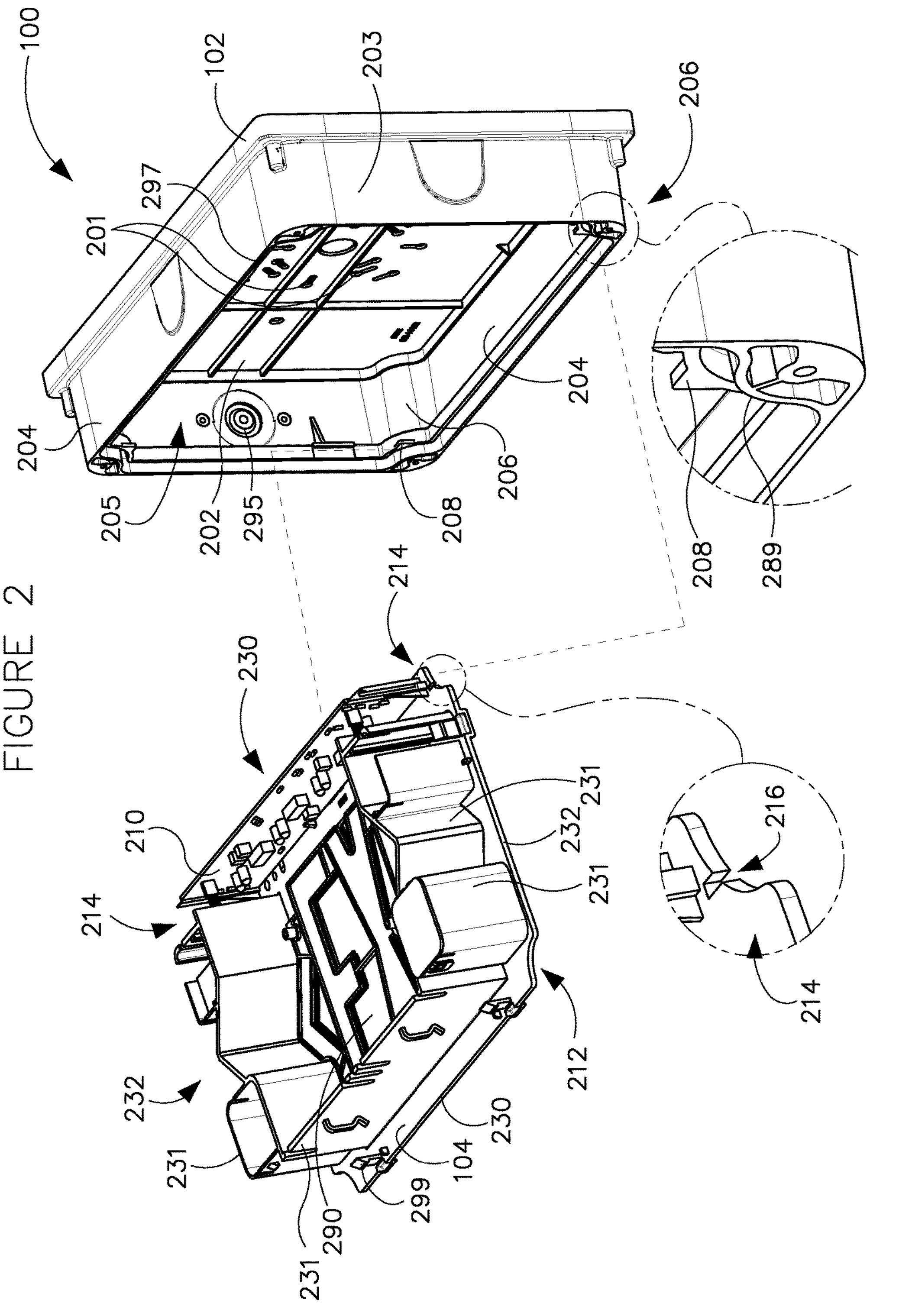
FIG. 2 illustrates a perspective view of a cover and a back plate of the example surface mounted light fixture, in accordance with example embodiments of the present disclosure.
Figure 3:
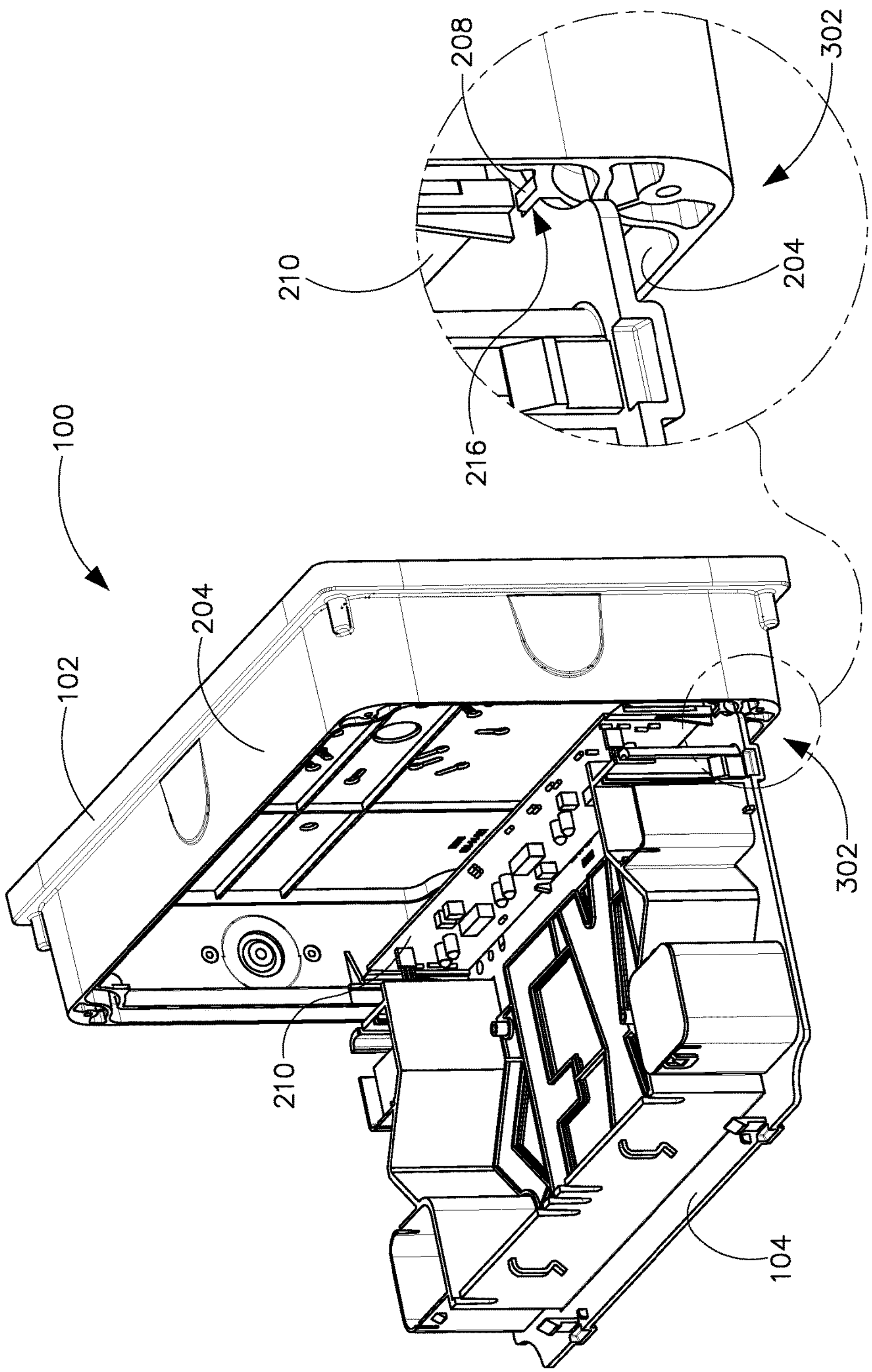
FIG. 3 illustrates another perspective view of the example surface mounted light fixture with the cover inserted into the back plate and rigidly held in proximity to each other during installation using example hanging features that are cast into the cover and the back plate, in accordance with example embodiments of the present disclosure.
Figure 4:
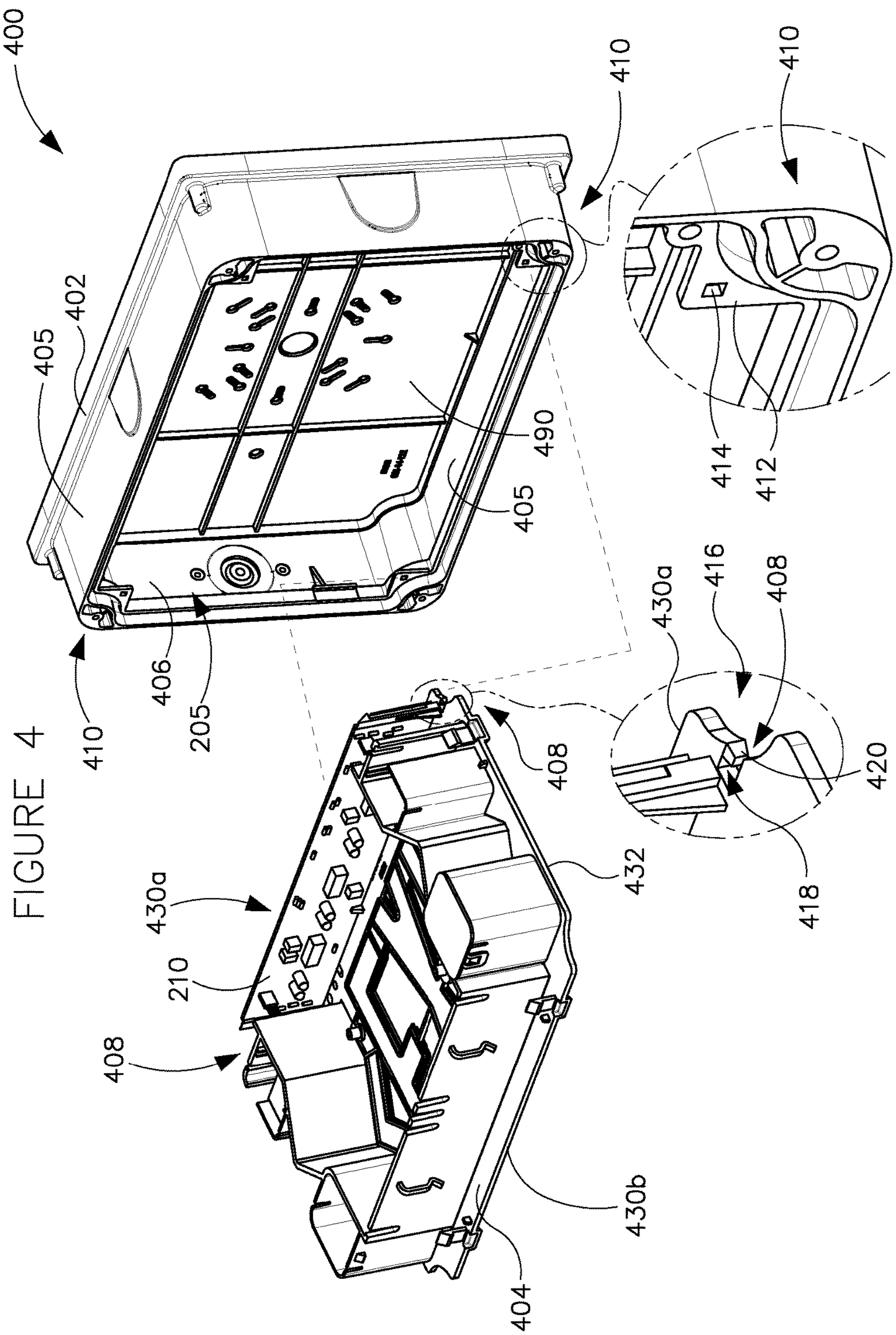
FIG. 4 illustrates a perspective view of the cover and the back plate of another example surface mounted light fixture, in accordance with example embodiments of the present disclosure.
Figure 5:
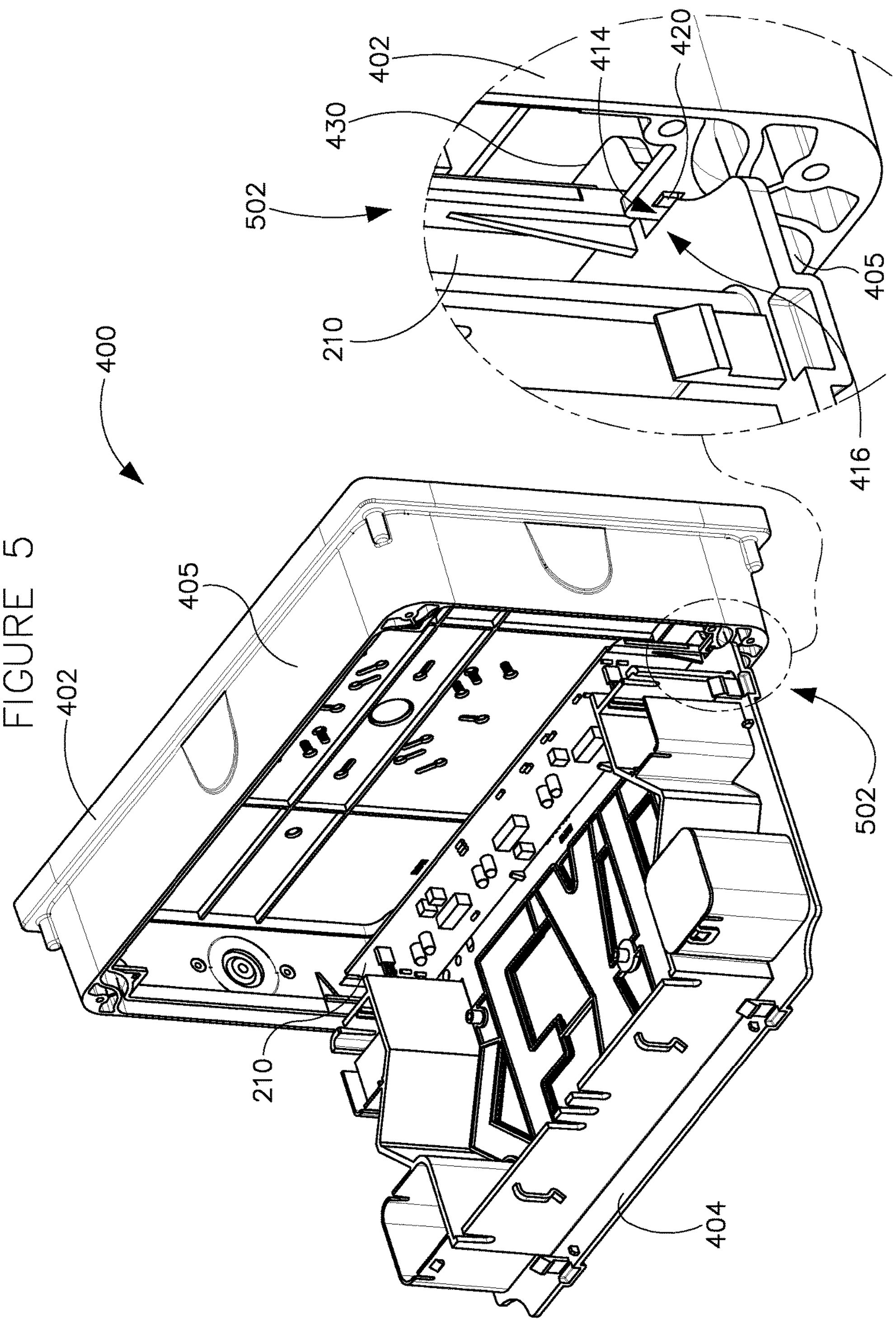
FIG. 5 illustrates another perspective view of the example surface mounted light fixture of FIG. 4 with the cover inserted into the back plate and rigidly held in proximity to each other during installation using other example hanging features that are cast into the two parts, in accordance with example embodiments of the present disclosure.

Turning to the figures, FIG. 1-3 will describe one example hanging feature of an example surface mounted light fixture; and FIGS. 4 and 5 will describe another example hanging feature of another example surface mounted light fixture.

FIG. 1 illustrates a front perspective view of an example surface mounted light fixture, in accordance with example embodiments of the present disclosure; FIG. 2 illustrates a perspective view of a cover and a back plate of the example surface mounted light fixture, in accordance with example embodiments of the present disclosure; and FIG. 3 illustrates another perspective view of the example surface mounted light fixture with the cover inserted into the back plate and rigidly held in proximity to each other during installation using example hanging features that are cast into the cover and the back plate, in accordance with example embodiments of the present disclosure.

Referring to FIGS. 1-3, an example surface mounted light fixture 100 (herein 'light fixture') may include two parts, i.e., a back plate 102 and a cover 104. The back plate 102 may include a substantially planar base 202 having one or more mounting features 201 configured to mount the back plate 102 on any appropriate mounting surface, such as a vertical wall, a ceiling, etc. Further, the back plate 102 may include a sidewall that is substantially perpendicular to the base 202 and extends along a perimeter of the base 202. The sidewall may include two longitudinal walls 204 and two lateral walls 203 that are arranged with respect to the base 202 such that they define a cavity 205. Further, the corners 206 of the back plate, i.e., intersection of the longitudinal walls 204 with the lateral walls 203, may be indented as illustrated in FIG. 2 such that they accommodate the cut out corners 214 of the cover 104 when the cover 104 is coupled to the back plate 102 in an operational mode as illustrated in FIG. 1.

Additionally, the back plate 102 may include a rib 208 that is cast into the back plate 102 at each corner 206 of the back plate 102. In particular, the rib 208 that is disposed at a corner 206 defined by one end of the longitudinal wall 204 and a lateral wall 203 may extend towards the corner 206 defined by an opposite end of the same longitudinal wall 204 and an opposite lateral wall 203. The rib 208 may be substantially perpendicular to the sidewall and substantially parallel to the base 202. Each corner 206 may include a curved wall 289 (convex) that extends from the lateral wall 203 to the longitudinal wall 204, and the rib 208 may extend from the curved wall 289 disposed at each corner 206. As illustrated in FIGS. 2 and 3, the rib 208 may be planar and may have a substantially triangular shaped profile with the apex of the substantially triangular shaped rib 208 at each corner 206 extending into the cavity 205 and pointing towards an opposite corner of the back plate 102. In other example embodiments, the rib 208 may have any other appropriate shape or orientation without departing from a broader scope of the present disclosure. The back plate 102 may also include knockouts 295 that are configured to route/receive electrical wires therethrough.

The cover 104 of the light fixture 100 may include a front panel 290 that has a pair of longitudinal edges 230 and a pair of lateral edges 232. The corners (212, 214) of the front panel 290, i.e., the intersections of the longitudinal edges 230 with the lateral edges 232, may be cut out (concave) as illustrated in FIGS. 2-3 (and FIGS. 4-5). In particular, the corners (212, 214) of the cover 104 may be cut out to reduce the length of the longitudinal edges 230 and/or the lateral edges 232 and thereby, to allow said edges of the cover 104 to be inserted inside the cavity 205 of the back plate 102 during the operational phase and/or the electrical connection phase as illustrated in FIGS. 1 and 3, respectively. Further, the cover 104 may include a notch 216 that is formed/cast into at least one cut out corner 214 of the cover 104 as illustrated in FIGS. 2 and 3. The notches 216 may have a length that is substantially parallel to the longitudinal edges 230 of the cover 104.

The cover 104 may also include one or more partition walls 231 that are disposed adjacent the longitudinal and lateral edges (230, 232) of the cover 104. The partition walls 231 may be substantially perpendicular to the front surface 290 and may extend along at least a portion of a perimeter of the front panel 290. Additionally, the cover 104 may house a circuit board 210 with one or more light sources, such as LEDs, halogen lamps, florescent lamps, etc., disposed thereon as illustrated in FIGS. 2 and 3. Even though the example embodiment of FIGS. 2 and 3 illustrates the circuit board 210 as being disposed on a partition wall 231 adjacent a longitudinal edge 230 between the corners 214 of the cover 104, one of ordinary skill in the art can understand and appreciate that in other example embodiments, the circuit board 210 with the light sources may be disposed at any other portion of the cover 104 or the back plate 102 without departing from a broader scope of the present disclosure.

Furthermore, the cover 104 may include coupling features 299, such as tabs, that are configured to mate with corresponding receiving features 297, such as hooks, of the back plate 102 to couple and securely lock the cover 104 to the back plate 102 as illustrated in FIG. 1, i.e., in an operational phase.

However, during the electrical connection phase, i.e., to make electrical connections during installation, initially, the back plate 102 may be mounted and secured on a mounting surface (vertical wall, ceiling, etc.) using an appropriate fastening mechanism. Then, the cover 104 may be rotated and positioned such that: (a) the cover 104 is substantially perpendicular to the back plate and (b) the longitudinal edge 230 of the cover 104 faces the base 202 of the back plate 102, as illustrated in FIG. 2. Further, the longitudinal edge 230 of the cover 104 (edge between corners 214) may be moved towards the base 202 of the back plate 102 such that: (a) the longitudinal edge 230 of the cover 104 is inserted in the cavity 205 defined by the back plate 102 (e.g., in between the lateral sidewalls 203 of the back plate 102) and (b) the notch 216 formed in the corners 214 of the cover 104 is aligned with and positioned above the ribs 208 formed in the corners 206 of the back plate 102. Then, the installer may slide the cover 104 down towards the longitudinal sidewall 204 of the back plate 102 such that the notch 216 engages the respective rib 208 to rigidly and securely hold the cover 104 in close proximity to the back plate 102 as illustrated in FIG. 3.

In other words, the cover 104 and back plate 102 are designed such that the cover 104 may be inserted into the cavity 205 above the ribs 208 and then pushed downward to engage the ribs and not simply pushed in horizontally to engage with the back plate 102 when coupled to make electrical connections. The engagement of the notch and rib provides a secure coupling between the cover 104 and the back plate 102 and prevents the cover 104 from disengaging from the back plate 102 when the installer (user) accidently brushes against the cover 104 or makes other similar motions while completing the electrical connections. Further, engaging the cover 104 and the back plate 102 by sliding the notch 216 of the cover 104 onto the corresponding ribs 208 of the back plate 102 from above prevents the cover 104 from disengaging and falling off from the back plate 102 when the cover 104 and back plate 102 are placed in proximity to each other for making electrical connections in a ceiling mount installation of the light fixture 100.

Even though FIG. 3 illustrates the longitudinal edge 230 (between corners 214) of the cover 104 being used to securely couple the cover 104 to the back plate 102, one of ordinary skill in the art can understand and appreciate that in other example embodiments, the lateral edges 232 of the cover 104 may be used to securely couple the cover 104 with the back plate 102. In said other example embodiments, notches that are substantially parallel to lateral edges 232 (not shown) may be formed in the cut out corners 212 and 214 of the cover 104. Further, the cover 104 may be rotated 90 degrees clockwise or counterclockwise from the position shown in FIG. 2 such that the lateral edge 232 of the cover 104 may be substantially perpendicular to and faces the base 202 of the back plate 102. Further, the lateral edge 232 of the cover 104 (edge between the corners 212 and 214) may be inserted into the cavity 205 of the back plate 102 such that the notches 216 on the corners 212 and 214 may be axially aligned with and disposed above the ribs of the back plate 102. In said example embodiments, the ribs of the back plate 102 may be substantially similar in shape, but larger in size than the ribs 208 of the back plate 102 that are illustrated in FIGS. 2 and 3. The size of the ribs may be large enough to engage the notches formed in the corners 212 and 214 on either side of the shorter lateral edge 232 of the cover 104. In another example embodiment, the lateral edge 232 of the cover 104 may be rigidly and securely coupled to back plate 102 by engaging the notches formed in the cut out corners 212 and 214 of the cover 102 with the ribs 208 disposed in corners 206 defined on opposite ends of the lateral wall 203 of the back plate 102. Furthermore, in some example embodiments, each cut out corner 212, 214 of the cover 104 may include more than one notch 216 formed therein, e.g., one notch that is parallel to the longitudinal edge 230 and another notch that is parallel to the lateral edge 232 of the cover 104.

Further, even though the example embodiment of FIG. 1 illustrates the partition walls 231 of the cover 104 as fitting within (inside) the cavity 205 defined by the sidewalls of the back plate 102 such that the front panel 290 of the cover 104 is flush with the back plate 102 (or edges of the back plate's sidewall), one of ordinary skill in the art can understand and appreciate that in other example embodiments, the cover 104 (or the partition walls 231 of the cover 104) may be configured to fit over and around the sidewall 204 of the back plate 102 without departing from a broader scope of the present disclosure. In said example embodiment, the cover 104 may have a sidewall that fits around the sidewalls of the back plate 102.

Furthermore, even though FIGS. 2-3 illustrate the cover 104 as having notches 216 that are formed in the cut out corners 214 (or 212) to engage corresponding ribs 208 in the back plate 102, one of ordinary skill in the art can understand and appreciate that in other example embodiments, the cover 104 and the back plate 102 may include other example mating features to rigidly hold the cover 104 and the back plate 102 in close proximity to each other for making electrical connections without departing from a broader scope of the present disclosure. For example, FIGS. 4 and 5 illustrate another example hanging feature for rigidly holding the cover 104 and the back plate 102 in close proximity to each other for making electrical connections.

FIG. 4 illustrates a perspective view of the cover and the back plate of another example surface mounted light fixture, in accordance with example embodiments of the present disclosure; and FIG. 5 illustrates another perspective view of the example surface mounted light fixture of FIG. 4 with the cover inserted into the back plate and rigidly held in proximity to each other during installation using other example hanging features that are cast into the two parts, in accordance with example embodiments of the present disclosure.

It is noted that light fixture 400 of FIGS. 4 and 5 is substantially similar to the light fixture of FIGS. 1-3, except for the configuration of the ribs 412 formed in the corners 410 of the back plate 402 and the notches 416 formed in the cut out corners 408 of the cover 404. Accordingly, the description of the features of the light fixture 400 other than the ribs 412 formed in the corners 410 of the back plate 402 and the notches 416 formed in the cut out corners 408 of the cover 404, e.g., the planar base 490 and the sidewalls 405 of the back plate 402, and the lateral edges 432 of the cover 404, will not be repeated herein for the sake of brevity.

Referring to FIGS. 4 and 5, to ensure a more secure coupling between the cover 104 and the back plate 102 during the electrical connection phase, the back plate 402 of the light fixture 400 may include an aperture 414 that is formed in each rib 412 disposed on the corners 410 of the back plate 402. Further, the notch 416 formed into the cut out corners 408 of the cover 404 of the light fixture 400 may be further extended or enlarged in the direction 418 (towards the longitudinal edge 430*a*) to define a post/finger 420 having a tip that points in the opposite direction towards the longitudinal edge 430*b* of the cover 404. To rigidly hold the cover 404 in close proximity to the back plate 402 while making electrical connections, the cover 404 may be rotated and positioned such that the cover 404 is substantially perpendicular to the back plate 402 as illustrated in FIG. 4. Further, the longitudinal edge 430*a* of the cover 404 may be inserted into the cavity 205 defined by the back plate 402 (e.g., in between the lateral sidewalls 406 of the back plate 402) such that the notch 416 formed in the corners 408 of the cover 404 is aligned with and positioned above the ribs 412 formed in the corners 410 of the back plate 402. Then, the installer may slide the cover 404 down towards the longitudinal sidewall 405 of the back plate 402 such that the notch 416 engages the respective rib 412. Finally, as illustrated in by enlarged portion 502 of FIG. 5, after the notches 416 of the cover 404 engage the corresponding ribs 412 of the back plate 402, the installer (user) may pull the cover 404 away from the back plate 402 that is securely mounted to a mounting surface such that the post 420 of the cover 404 engages the aperture 414 formed in the rib 412 of the back plate 402. The post 420 and the aperture 414 features provide a more secure coupling between the cover 404 and the back plate 402 of the light fixture 400.

To disengage the cover 404 from the back plate 402, the installer (user) may have to push the cover 404 towards the back plate 402 to release the post 420 of the cover 404 from the aperture 414 in the rib 412 of the back plate 402. Then, the installer may slide the cover 404 upwards to disengage the notch 416 of the cover 404 from the rib 412 of the back plate 402.

Even though FIGS. 4 and 5 illustrate a post 420 that is formed in the cut out corners 408 of the cover 404 such that the tip of the post 420 is directed towards the longitudinal edge 430*b* of the cover 404, one of ordinary skill in the art can understand and appreciate that in other example embodiments, the notch 416 may be further extended or enlarged in a direction opposite to the direction 418 shown in FIG. 4 such that it defines a post/finger whose tip is pointed in an opposite direction (towards the longitudinal edge 430*a*) than that illustrated in FIGS. 4 and 5 without departing from a broader scope of the present disclosure. In said example embodiment, instead of pulling the cover 404 away from the back plate 402 as described above, once the notch 416 of the cover 404 engages with the rib 412 of the back plate 402, the cover 404 may be pushed towards the back plate 402 such that the post 420 of the cover 404 engages the aperture 414 formed in the rib 412 of the back plate 402. Furthermore, in some example embodiments, the notch defined in the cut out corners of the cover may be further extended in other directions such that a post/finger 420 having a tip that points towards the lateral edge 432 of the cover 404 is formed therein. In some example embodiments, each cut out corner may have multiple fingers formed from each notch or different notches without departing from a broader scope of the present disclosure.

Even though the present disclosure describes that the hanging features such as the ribs, the ribs with the aperture, the notches, and/or the posts/fingers are cast into the cover and/or the back plate of the light fixture using a die-cast mechanism, one of ordinary skill in the art can understand and appreciate that any other appropriate manufacturing mechanism may be used to form the hanging features in the light fixture without departing from a broader scope of the present disclosure. Alternatively, in another example embodiment, one or more of the hanging features may be configured to be removably coupled to the cover and/or back plate of the light fixture without departing from a broader scope of the present disclosure. Accordingly, in an example embodiment, the back plate 102 may include a first securing element that is cast into and disposed at or adjacent the corners (intersection of sidewalls) of the back plate 102, and the cover 104 may have a second securing element that is complementary to the first securing element and cast into and disposed at or adjacent the corners of the cover 104. In some examples, the first securing element and the second securing element may be removably coupled to the back plate 102 and the cover 104. The first securing element may include, but is not limited to, the rib 412, a tab, or other functionally similar elements. The second securing element may include, but is not limited to, the notch 216, the notch 416 coupled with the post 420, a hook, or other functionally similar elements. Alternatively, the first securing element may include the notch 216, the notch 416 coupled with the post 420, a hook, or other functionally similar elements, while the second securing element may include the rib 412, a tab, or other functionally similar elements. During the electrical connection phase, the cover 104 may be rigidly and securely held in close proximity to the back plate 102 by engaging the first securing element of the back plate 102 with the second securing element of the cover 104 as illustrated in FIGS. 3 and 5.

Even though the present disclosure describes a surface mounted light fixture 100 having a substantially rectangular profile, one of ordinary skill in the art can understand and appreciate that the cover and/or the back plate of the surface mounted light fixture can have a profile of any other appropriate geometric or non-geometric shape without departing from a broader scope of the present disclosure.

Although the present disclosure is described with reference to example embodiments, it should be appreciated by those skilled in the art that various modifications are well within the scope of the present disclosure. From the foregoing, it will be appreciated that an embodiment of the present disclosure overcomes the limitations of the prior art. Those skilled in the art will appreciate that the present disclosure is not limited to any specifically discussed application and that the embodiments described herein are illustrative and not restrictive. From the description of the example embodiments, equivalents of the elements shown therein will suggest themselves to those skilled in the art, and ways of constructing other embodiments of the present disclosure will suggest themselves to practitioners of the art. Therefore, the scope of the present disclosure is not limited herein.

What is claimed is:

1. A light fixture comprising:
- a back plate that is configured to be mounted to a mounting surface and comprising:
  - a base;
  - a sidewall disposed adjacent to a perimeter of the base, wherein the sidewall is substantially perpendicular to the base and defines a cavity in concert with the base; and
  - a rib formed in at least one corner of the sidewall; and
- a cover that is configured to be coupled to the back plate and comprising:
  - a front panel having one or more corners that are cut out such that at least a portion of the front panel fits within the cavity when coupled to the back plate in an electrical connection phase, wherein at least one corner of the cover comprises a notch formed therein, wherein the notch extends through the front panel, and
    - wherein in the electrical connection phase, the cover is coupled to the back plate by engaging the notch formed in the at least one corner of the cover with the rib formed in the at least one corner of the sidewall of the back plate such that the rib extends through and is disposed in the notch.

2. The light fixture of claim 1, wherein the mounting surface is a vertical wall.

3. The light fixture of claim 1, wherein the mounting surface is a ceiling.

4. The light fixture of claim 1:

wherein the rib of the back plate comprises an aperture, and wherein the notch formed in the at least one corner of the cover is further extended to define a post.

5. The light fixture of claim 4, wherein once the notch of the cover engages the rib of the back plate, the cover may be adjusted such that the post of the cover engages the aperture in the rib of the back plate.

6. The light fixture of claim 4, wherein the rib, the notch, and the post are formed in the light fixture by a die-casting mechanism.

7. The light fixture of claim 1, wherein the base of the back plate comprises a plurality of mounting apertures formed therein to mount the light fixture to the mounting surface.

8. The light fixture of claim 1, wherein the cover comprises a plurality of partition walls that are disposed on the front panel and extending substantially perpendicular to the front panel.

9. The light fixture of claim 8, wherein the cover comprises a circuit board disposed on one of the partition walls, wherein the circuit board comprises a plurality of light sources disposed on and electrically coupled to the circuit board, and wherein the plurality of light sources are light emitting diodes.

10. A light fixture comprising:

a back plate that is configured to be mounted to a mounting surface and comprising:

a base;

a sidewall disposed adjacent to a perimeter of the base, the sidewall defining a cavity in concert with the base; and a first securing element formed in the sidewall; and a cover that is configured to be coupled to the back plate and comprising:

a front panel that is defined such that at least one edge that forms a boundary of the front panel is disposed within the cavity formed by the sidewall of the back plate when the cover is coupled to the back plate in an electrical connection phase, a second securing element formed in the front panel, wherein in the electrical connection phase, the cover is coupled to the back plate by engaging the second securing element formed in the cover with the first securing element formed in the sidewall of the back plate such that the cover is substantially perpendicular to the back plate and the cavity is exposed.

11. The light fixture of claim 10, wherein the first securing element is a rib that is substantially perpendicular to the sidewall and substantially parallel to the base, and wherein the rib is formed in at least one corner of the sidewall.

12. The light fixture of claim 10, wherein the first securing element is a rib that has an aperture formed therein.

13. The light fixture of claim 10, wherein the second securing element is a notch formed in at least one corner of the cover, and wherein the at least one corner of the cover is cut out to define a concave shaped recess.

14. The light fixture of claim 10, wherein the first securing element is a rib that has an aperture formed therein, and wherein the second securing element is a post formed in a corner of the cover by further extending a notch that is formed in the corner.

15. The light fixture of claim 14, wherein once the notch of the cover engages the rib of the back plate such that the rib extends through and is disposed in the notch, the cover may be adjusted such that the post of the cover extends through and is disposed in the aperture in the rib of the back plate.

16. The light fixture of claim 14, wherein the rib, the notch, and the post are formed in the light fixture by a die-casting mechanism.

17. The light fixture of claim 10, wherein the mounting surface is a vertical wall.

18. The light fixture of claim 10, wherein the mounting surface is a ceiling.

19. The light fixture of claim 10, wherein the cover comprises a circuit board disposed on a partition wall of the cover, wherein the circuit board comprises a plurality of light sources disposed on and electrically coupled to the circuit board, and wherein the plurality of light sources are light emitting diodes.

20. The light fixture of claim 10, wherein the first securing element is a notch, and wherein the second securing element is a rib.

* * * * *